United States Patent [19]
Giebel et al.

[11] Patent Number: 4,945,593
[45] Date of Patent: Aug. 7, 1990

[54] AUTOMATIC DETERMINATION OF COORDINATES OF THE OPERATING PATH OF AN ADHESIVE-APPLYING NOZZLE IN AN ADHESIVE APPLICATOR FOR A SHOE MACHINE

[75] Inventors: Gerhard Giebel, Bad Soden; Hans-Jürgen Berny, Heusenstamm; Albrecht Siegel, Franfurt am Main, all of Fed. Rep. of Germany

[73] Assignee: DVSG Engineering und Patentverwaltungs GmbH, Frankfurt am Main, Fed. Rep. of Germany

[21] Appl. No.: 323,936

[22] Filed: Mar. 15, 1989

[30] Foreign Application Priority Data

Apr. 6, 1988 [DE] Fed. Rep. of Germany ....... 3811565

[51] Int. Cl.⁵ .................... A43D 25/18; A43D 25/00
[52] U.S. Cl. ........................................... 12/12.4; 12/12
[58] Field of Search ................. 12/8.8, 10, 10.5, 12, 12/12.4, 12.5, 10.1, 146 L, 12.5

[56] References Cited

U.S. PATENT DOCUMENTS

| | | | |
|---|---|---|---|
| 4,407,033 | 10/1983 | Garner et al. | 12/10.1 |
| 4,653,133 | 3/1987 | Giebel | 12/12.4 |
| 4,654,914 | 4/1987 | Leeper | 12/10.5 |
| 4,679,269 | 7/1987 | Becka et al. | 12/12.5 |
| 4,728,378 | 3/1988 | Bianchi | 12/12 |
| 4,817,222 | 4/1989 | Shafir | 12/146 L |

FOREIGN PATENT DOCUMENTS

0084949 8/1983 European Pat. Off. .

*Primary Examiner*—Steven N. Meyers

[57] ABSTRACT

The supports (9; 35) by which adhesive-applying nozzles (6) are supported in a shoe machine, e.g. a cement lasting machine, for tracking movement along opposite portions of a shoe bottom (5), are provided with mountings (34) by each of which either such a nozzle (6) or a sensing head (20) can be supported. In the latter case, as the sensing heads (20) are moved in the X-direction under the control of a stepping motor (18), the heads sense the edge of the insole (which may be provided with a black line (23, 24) and by feedback signals are caused to follow it, thereby determining the Y-axis movement corresponding to the X-axis movement necessary to guide the nozzle in the subsequent adhesive-applying operation. The Y-axis movement is stored at memory locations for which the X-direction movement values constitute the address. When, therefore, subsequently in an adhesive-applying operation, the nozzles are caused to track along the X-axis, the Y-axis information is accessed and the nozzles are moved in the Y-coordinate axis direction accordingly.

12 Claims, 4 Drawing Sheets

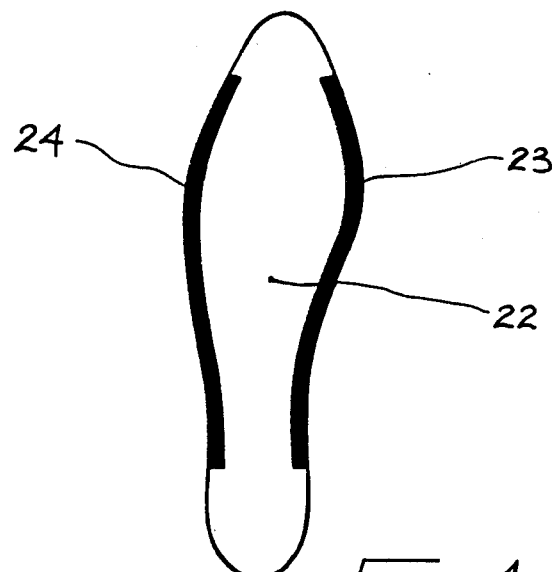
Fig-4
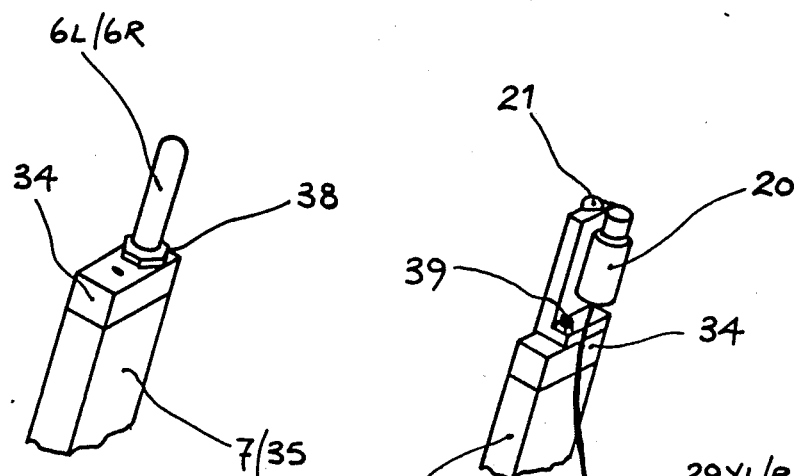
Fig-5
Fig-6

AUTOMATIC DETERMINATION OF COORDINATES OF THE OPERATING PATH OF AN ADHESIVE-APPLYING NOZZLE IN AN ADHESIVE APPLICATOR FOR A SHOE MACHINE

BACKGROUND OF THE INVENTION

This invention is concerned with a method of and machine for automatically determining coordinates of an operating path of an adhesive-applying nozzle of an adhesive applicator device for a shoe machine using an optical sensing head which is guided along the operating path by advancing movement along two coordinate axes under the control of a guidance system, wherein for each step of movement along one of said coordinate axes the coordinate axis value thereof and also the corresponding coordinate axis value along the other coordinate axis are determined and stored.

One adhesive applicator device for use in a shoe machine, namely a cement lasting machine, is disclosed in U.S. patent specification No. 440,7033 and comprises two adhesive-applying nozzles operating along opposite sides of a shoe bottom. For thus moving the nozzles numerically controlled stepping motors are provided, themselves controlled by a computer to which the individual coordinate axis values for the movement of the nozzles are supplied.

For determining these coordinate axis values, a procedure is disclosed in European Patent Specification No. 0084949, in accordance with which a transparent sheet provided with a coordinate grid is laid on the insole of the shoe so that the contours of the latter can be seen through the sheet. On the coordinate grid the particular coordinate axis values for the operating path of the adhesive-applying nozzles along the opposite sides of the shoe bottom are read off and manually inputted into the memory of the aforementioned computer.

In addition, where it is desired automatically to guide a sensing head along a path and convert discrete coordinates of points along said path into digital values, it is known, e.g. from U.S. patent specification No. 3,624,283, to move the sensing head along two mutually perpendicular coordinate axes, the head recognising the path by optical means which is effective to control stepping motors for the two coordinate axes in such a manner that the sensing head follows the path. In this case coordinate axes values are determined which indicate the particular coordinates of the sensing head. These coordinate axis values can for example be supplied to a punched tape for subsequent utilisation.

OBJECT OF THE INVENTION

The object of the present invention is to render automatic the determination of the coordinate axis values of the operating path of one or more adhesive-applying nozzles of an adhesive applicator device for a shoe machine, without the use of a grid, which is time-consuming and tedious.

SUMMARY OF THE INVENTION

The invention thus provides, in one of its several aspects, a method of automatically determining coordinates of an operating path of an adhesive-applying nozzle of an adhesive applicator device for a shoe machine using an optical sensing head which is guided along the operating path by advancing movement along two coordinate axes under the control of a guidance system, in carrying out which method for each step of movement along one of said coordinate axes the coordinate axis value thereof and also the corresponding coordinate axis value along the other coordinate axis are determined and stored, wherein the sensing head is mounted in the adhesive applicator device in place of the adhesive-applying nozzle, said head being resiliently urged into engagement with the bottom of a shoe placed in the adhesive applicator device and thus following its height contour, whereby the operating path along one or both of the sides of the shoe bottom is sensed in three dimensions, and wherein the coordinate axis values obtained in this way in two dimensions are stored as aforesaid in a memory, for subsequent utilisation in controlling drive means, operable along the two coordinate axes, of the adhesive applicator device.

For determining the coordinate axis values of the operating path, furthermore, a machine thus serves wherein these coordinate values are then used for controlling the adhesive applicator device forming part of the machine. In this manner characteristics of this machine affecting the determination of the coordinate axis values of the operating path also similarly arise in the subsequent adhesive-applying operation, so that errors can be avoided which might otherwise arise in the transfer from the path determining mode to the operating mode. In this way also the third coordinate axis, which is associated with the height contour (or spring) of the shoe, is automatically taken into account provided that the shoes to the bottoms of which adhesive is to be applied are used in determining the coordinate axis values. More particularly, since the spring of the shoe is followed in each case by resiliently pressing the sensing head or the adhesive-applying nozzle, as the case may be, thereagainst for the same X and Y coordinate axis values, the particular height contour is automatically taken into accout without it being necessary separately to store the third coordinate. The coordinate axis values determined in this way are then stored in memory and can thereafter be used directly for controlling a two-coordinate drive of the same machine in the treatment of the same shoe.

The invention further provides a machine for performing a progressive adhesive-applying operation along marginal portions of shoe bottoms, comprising a shoe support for supporting a shoe to the bottom of which adhesive is to be applied, a mounting on which selectively an adhesive-applying nozzle of a sensing head can be mounted, said mounting being resiliently urged in a direction towards the bottom of a shoe supported by the shoe support, drive means for moving the mounting along two coordinate axes relative to the shoe bottom, and computer control means for controlling the movement of the mounting along the two coordinate axes along a desired operating path, under the action of the drive means, said computer control means including a memory in which information comprising coordinate axis values for such operating path is stored, wherein, in a path-determining mode of the machine, with a sensing head mounted on the mounting and with an outline of the desired operating path supported by the shoe support, the drive means is caused to operate to move the mounting along one of said coordinate axes and, in response to the path of the sensing head diverging from said outline, to move the mounting along the other of said coordinate axes thus to maintain a desired relationship, in the direction of said other of the coordinate axes, between the outline and the sensing head, and wherein the computer control means monitors the movement of the mounting along the two axes and stores in the memory of the coordinate axis values for each of a succession of points along said axes, said values constituting the information by which, in the adhesive-applying mode of the machine, the mounting is moved along the desired operating path as aforesaid.

By reason of this construction the machine can be converted simply and quickly; thus, when a new shoe bottom shape is to be introduced, the coordinate axis values of the appropriate operating path can quickly be determined automatically and, by reason of the information being fed directly into the machine control, the adhesive-applying operation can then be executed directly in accordance with the new operating path.

Conveniently, adjacent the sensing head is arranged a slide abutment which is resiliently urged against the shoe bottom and serves to hold the sensing head at a defined distance from the shoe bottom. This thus results in the sensing head not coming into contact with the shoe and thus prevents it from being soiled thereby, while the resilient mounting of the slide abutment ensures that the spring of the shoe is constantly taken into account.

A particularly convenient construction of the machine results from supporting the mounting on a lever arm which is itself mounted for movement in a direction extending lengthwise of the shoe bottom (X-axis movement) by pivoting it about a first axis and for movement in a direction extending transversely of the shoe bottom (Y-axis movement) by pivoting it about a further axis arranged perpendicular to the first axis, drive motors being associated with said axes for effecting such pivoting movement of the lever arm and thus the movement of the nozzle or sensing head along the X- and Y-axes. In this was complicated and expensive slide arrangements are avoided, the guidance of both the sensing head and the nozzle being effected through the lever arm the pivotal axes of which are arranged at a sufficient distance from the shoe bottom as to ensure that, bearing in mind the resilient pressure applied to the nozzle or slide abutment, contact thereof with the shoe bottom is constantly maintained.

In one preferred embodiment of the invention two mountings are provided, each supporting a nozzle or sensing head whereby such nozzles or sensing heads can be caused to operate progressively as aforesaid along opposite sides of the shoe bottom. With this construction, furthermore, it is possible to provide a common drive motor in the one coordinate axis direction for the two guidance systems.

It should be pointed out that for the determination of the operating path along the shoe bottom the outline is preferably a marking on the insole of the particular shoe, which thus creates a light/dark boundary between the marking and the adjacent portion of the insole and facilitates the recognition of the boundary by the sensing head. This marking is conveniently formed by creating a black line along the edge of the insole over a pre-determined width, e.g. 6 mms.

BRIEF DESCRIPTION OF THE DRAWINGS

One exemplary but non-limiting embodiment of the invention is shown in the Figures, in which:

FIG. 4 is a diagram showing the marking of a shoe insole for use in determining the operating path of nozzles of the device of FIGS. 1 and 2;

FIG. 5 is a fragmentary view of an end of a lever arm supporting an adhesive-applying nozzle; and FIG. 6 is a fragmentary view, generally similar to FIG. 5, but showing a sensing head and associated parts in place of the nozzle.

DESCRIPTION OF THE PREFERRED EMBODIMENT

Figure 1:
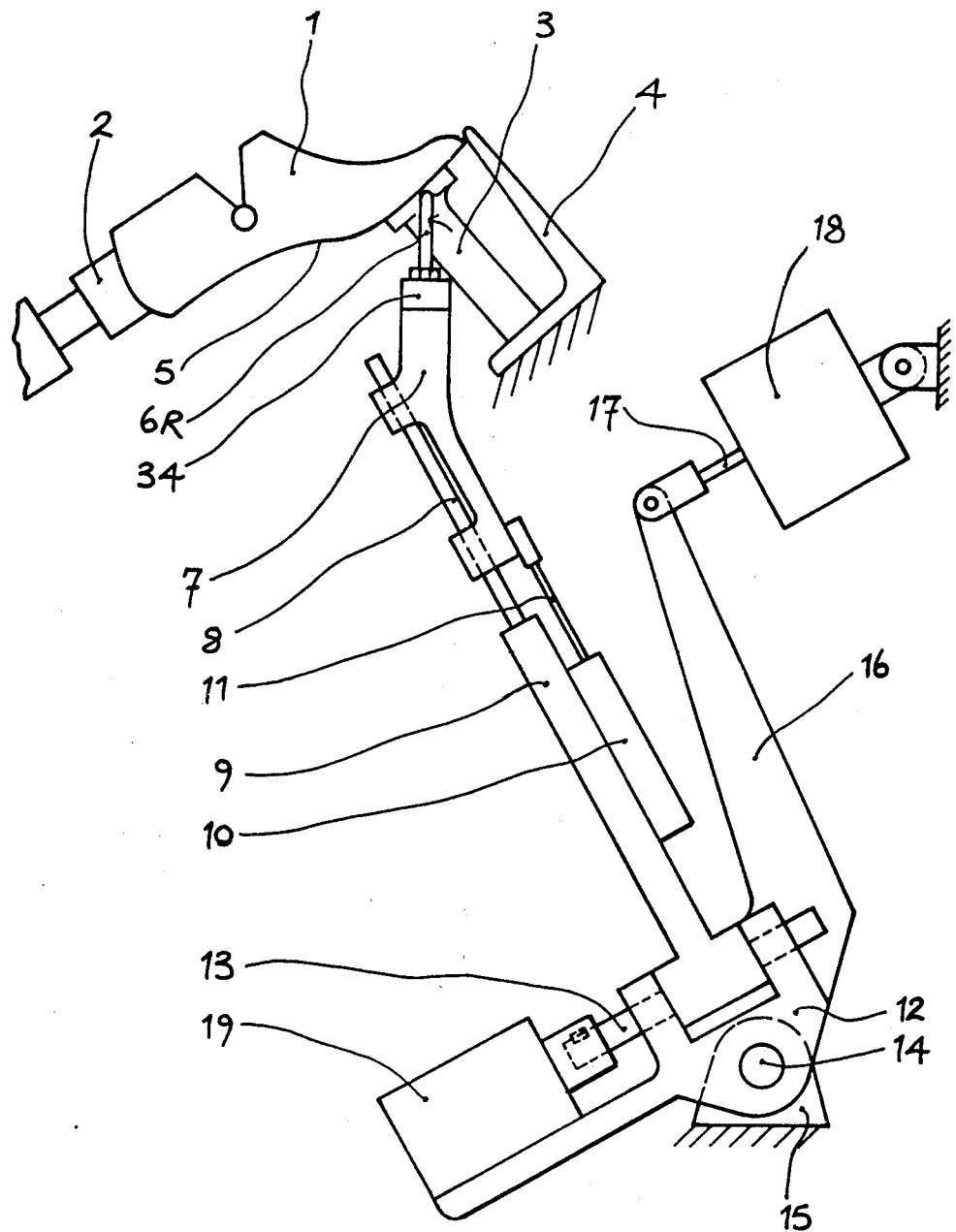
FIG. 1 is an illustration, in principle, of the adhesive applicator device, in side view, together with a shoe, for use in carrying out a method in accordance with the present invention.
Figure 2:
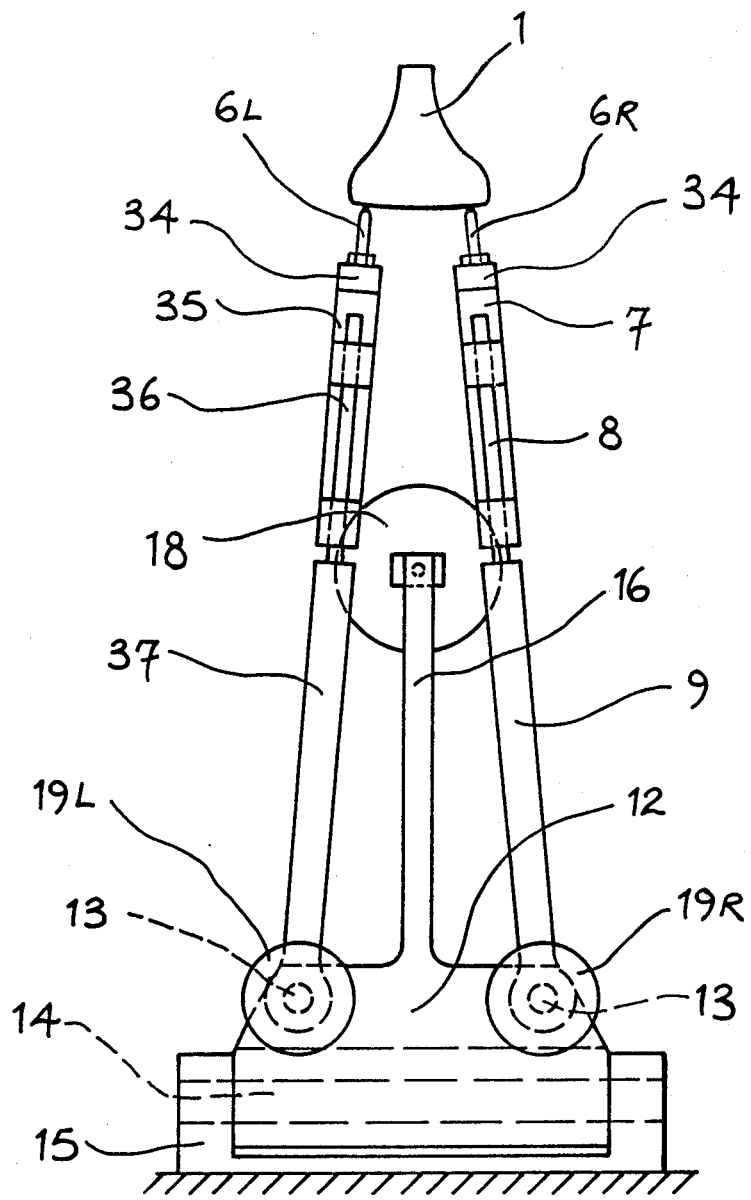
FIG. 2 is a front view of the adhesive applicator device of FIG. 1.

The machine in accordance with the invention as shown in FIGS. 1 and 2 is generally similar, except as hereinafter described, to the machine disclosed in European Patent Specification No. 0055107. In said machine, a lasted shoe 1 is held at its heel end by means of a heel support 2 and at its toe end by a last support 3, a toe stop 4 being provided which determines the lengthwise position of the shoe. Two adhesive-applying nozzles 6R, 6L are mounted for movement along opposite sides of the bottom 5 of the shoe 1, being supplied with adhesive in known manner from an adhesive supply (not shown).

The two nozzles are both mounted in a similar manner and only the right-hand nozzle and its mounting will now be described with reference to FIG. 1; reference numerals in brackets relate to the mounting for the left-hand nozzle 6L: see FIG. 2. The adhesive-applying nozzle 6R is held by means of a nut 38 (see FIG. 5) in a mounting 34 at the end of a slide member 7 (35) which is supported for lengthwise displacement on a rod 8 (36). The rod 8 projects from a lever arm 9 (37) which also carries a pneumatically actuated piston-and-cylinder arrangement 10 a piston rod 11 fo which is connected to the slide member 7, so that, upon actuation of the piston-and-cylinder 10, the slide member and thus the nozzle 6R (6L) is moved to-and-fro in the lengthwise direction of the rod 8 (36). In this way the nozzle 6R (6L) can be resiliently urged against the shoe bottom 5 under a pressure similar to a spring pressure.

The lever arm 9 (37) is mounted in a bearing block 12 for pivotal movement about an axis 13 (13). The bearing block 12 is itself mounted for pivotal movement about an axis 14 supported on a frame portion 15 of the machine and extending perpendicularly to the axis 13 (13). The lever arm 9 (37) can thus pivot in two coordinate axis directions X, Y; more particularly, by pivoting about the axis 14, the arm is moved in the X coordinate axis direction lengthwise along the shoe bottom while, by pivoting about the axis 13 (13), it is moved in the Y coordinate axis direction transversely of the shoe bottom.

For effecting pivotal movement of the arm 9 (37) about the axis 14, the bearing block 12 has an extension 16 at the end of which a push-rod 17 forming part of a drive motor 18 is connected. In the machine now being described this motor is a stepping motor, but it is also possible to use a piston-and-cylinder arrangement which is controlled in such a manner that it can cause a step to be executed e.g. by the supply of a signal (pulse). Under the action of the motor 18 the nozzle 6R (6L) is thus moved in a direction extending lengthwise of the shoe bottom 5. Similarly, for effecting pivotal movement of the arm 9 (37) about the axis 13 (13) a further drive motor 19R (19L), which can also be a stepping motor, is provided an output shaft of which is rotationally connected with the pivot pin forming the axis 13 (13). Under the action of the motor 19R (19L), the nozzle is thus moved in a direction extending transversely of the shoe bottom. The lever arm 9 (37) together with the drive arrangements associated therewith thus constitutes a guidance system for the nozzle 6R (6L).

The two adhesive-applying nozzles 6R, 6L, for operating one on each side of the shoe bottoms, are shown in FIG. 2, from which it will be appreciated that the lever arms 9, 37 are mounted on a common bearing member 12, for common pivotal movement about the axis 14, but are separately mounted for separate pivotal movement about their respective axes 13.

For determining the operating path of the adhesive-applying nozzle 6R (6L) in carrying out a method in accordance with the present invention the nozzles are removed from their respective mountings 34 and are each replaced by a unit consisting of a sensing head 20 and a slide abutment 21 (see FIG. 6). Each unit is held in place on the mounting 34 by a screw 39. The sensing heads 20 can thus be moved along the shoe bottom 5 under control by the drive motors 18, 19R (19L). Moreover, the piston-and-cylinder arrangements 10 resiliently urge the slide abutments 21 against the insole 22 such that the sensing heads 20 are spaced at the desired distance from the insole surface.

For facilitating the guidance of the units an insole 22 of the shoe has a marking applied thereto (FIG. 4) comprising two black lines 23, 24, each about 6 mm wide, arranged one at each side of the insole, each of which lines is in sharp contrast with an adjacent portion of the insole. This line 24 is identified by its associated optical sensing head 20, so that when the heads are driven in the X-coordinate axis direction by the motor 18 they each constantly sense the boundary between their associated black lines 23 or 24 and the adjacent portion of the insole 22 and, as will be explained further below, cause their respective drive motors 19R, 19L to be operated, whenever the nozzle path diverges from the boundary in the Y-coordinate axis direction, to return the sensing head 20 in question in said direction back to its correct disposition in relation to said boundary.

Figure 3:
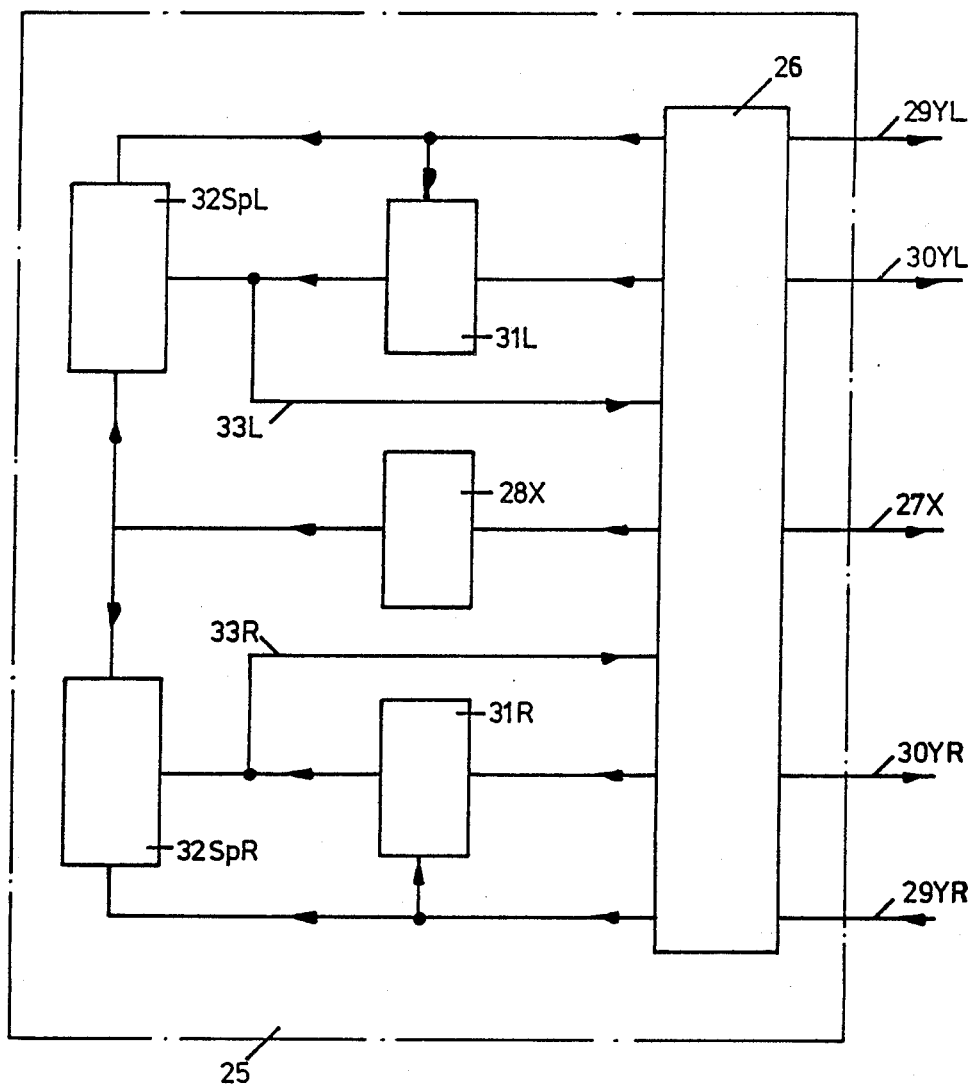
FIG. 3 is a block diagram of a computer for controlling a guidance system of the device of FIGS. 1 and 2.

To this end, the drive motors 18, 19R, 19L are controlled by a computer 25 (FIG. 3) which also controls said motors in the operating mode of the machine, viz. for driving the adhesive-applying nozzles 6R, 6L along their respective operating paths.

For maintaining each sensing head 20 in its correct disposition in relation to its associated boundary, the computer 25 operates to evaluate feedback signals supplied by the sensing heads 20 thus to control the drive motors 18, 19R, 19L. Thus, in a path-determining mode of the machine, control signals are supplied to the drive motor 18 via line 27X by a central processor unit 26. These control signals step the drive motor 18, and thus advance the sensing heads 20, a signal (pulse) being supplied by the central processor unit 26 to a counter 28X in respect of each step and being summed thereby. With each such step information is fed back to the central processor unit 26 via the feedback lines 29YR, 29YL, indicating whether either of the black lines 23, 24 has diverged from the path being followed by the sensing heads 20 in being so advanced. Such a divergence would of course be indicated by a change in brightness sensed by the sensing head 20, thus a generating corresponding feedback signal. The feedback signals coming via the lines 29YR, 29YL are converted by the central processor unit 26 into control signals in the form of pulses supplied on lines 30YR, 30YL to the drive motors 19R, 19L. These pulsed signals are further supplied by the central processor unit 26 to counters 31R, 31L, one associated with each sensing head 20. Each counter sums or subtracts the signals supplied to its associated drive motor 19R, 19L, in returning its associated sensing head 20 to the correct disposition in relation to the light/dark boundary, such return being monitored by the computer as a result of the feed back along the lines 29YR, 29YL. The evaluation of the feedback signals returning on the lines 29YR, 29YL as a function of constantly returning the sensing heads 20 to the light-/dark boundary at the edge of the black lines 23, 24 is known, so that no further details need be set out here in this connection.

Thus, for each individual step executed by the drive motor 18, which steps are counted by the counter 28X, the corresponding steps of the drive motors 19R, 19L are counted by the counters 31R, 31L. Moreover, for storing the results of these counts, the computer 25 further comprises memorys 32SpR, 32SpL to which, in respect of each step counted by the counter 28X, the count results of the counters 31R, 31L are transmitted by the central processor unit 26, and in which, using the step count given by the status of the counter 28X as a memory address, the corresponding count values of the counters 31R, 31L are respectively stored. In this way the Y-coordinate axis values for the black lines 23, 24 are successively stored in the memories 32SpR, 32SpL in response to the individual steps of the drive motor 18, which steps represent in each case a memory address, the corresponding X-coordinate axis value in each case being obtained from the current status of the counter 28X.

The information thus stored in thus represents the operating path to be followed by the nozzles 6R, 6L in applying adhesive along opposite side portions of the shoe bottom. More particularly, for the application of adhesive the computer is effectively used in a reverse manner. The central processor unit 26 again controls the drive motor 18 step-by-step via line 27X, the control signals supplied by the central processor unit 26 being simultaneously passed to the counter 28X which, according to its current status, as referred to above, determines the address for the memories 32SpR, 32SpL. Thus, for each status of the counter 28X the appropriate Y-coordinate axis values, which are stored in the memories 32SpR, 32SpL, are read via lines 33R, 33L and supplied to the central processor unit 26 which in response thereto supplies appropriate signals vai lines 30YR, 30YL to the drive motors 19R, 19L which thereupon execute the instructed steps in the Y-coordinate axis direction.

In this way the adhesive-applying nozzles 6R, 6L are guided along opposite sides of the shoe bottom 5 step-by-step in the X-coordinate axis direction and in the Y-coordinate axis direction in accordance with the value as read in the memory 32SpR, 32SpL. When effecting this latter function, the lines 29YR, 29YL of course play no part, since no feedback signals are supplied via them.

Instead of the motor 18 being driven step-by-step under the control of the central processor unit 26, alternatively said motor can be driven independently, the X-axis movement thus constituting a "control" axis. In such a case, in response to movement of the nozzles along the X-axis stepped pulses are supplied via line 27X to the central processor unit 26, which then supplies corresponding pulses to the counter 28X. The result of storing the relevant coordinate axis values in the memories 32SpR, 32SpL and the subsequent control of the drive motor 19R, 19L remains the same, viz. said motors obtain their Y-coordinate axis values from the memories 32SbR, 32SpL as the drive motor 18 operates and at the same time supplies its stepped pulses to the central processor unit as aforesaid.

We claim:

1. A method of automatically determining coordinates of an operating path of an adhesive-applying nozzle of an adhesive applicator device for a shoe machine using an optical sensing head which is guided along the operating path by advancing movement along two coordinate axes under the control of a guide system, in carrying out which method for each step of movement aong one of said coordinate axes the coordinate axis value thereof and also the corresponding coordinate axis value along the other coordinate axis are determined and stored, wherein the sensing head is mounted in the adhesive applicator device in place of the adhesive-applying nozzle, said head being resiliently urged into engagement with the bottom of a shoe placed in the adhesive applicator device and thus following its height contour, whereby the operating path along one or both of the sides of the shoe bottom is sensed in three dimensions, and wherein the coordinate axis values obtained in this way in two dimensions are stored as aforesaid in a memory, for subsequent utilisation in controlling drive means, operable along the two coordinate axes, of the adhesive applicator device.

2. A machine for performing a progressive adhesive-applying operation along marginal portions of shoe bottoms, comprising a shoe support for supporting a shoe to the bottom of which adhesive is to be applied, a mounting on which selectively an adhesive-applying nozzle or a sensing head can be mounted, said mounting being resiliently urged in a direction towards the bottom of a shoe supported by the shoe support, drive means for moving the mounting along two coordinate axes relative to the shoe bottom, and computer control means for controlling the movement of the mounting along the two coordinate axes along a desired operating path, under the action of the drive means, said computer control means including a memory in which information comprising coordinate axis values for such operating path is stored, wherein, in a path-determining mode of the machine, with a sensing head mounted on the mounting and with an outline of the desired operating path supported by the shoe support, the drive means is caused to operate to move the mounting along one of said coordinate axes and, in response to the path of the sensing head diverging from said outline, to move the mounting along the other of said coordinate axis thus to maintain a desired relationship, in the direction of said other of the coordinate axes, between the outline and the sensing head, and wherein the computer control means monitors the movement of the mounting along the two axes and stores in the memory the coordinate axis values for each of a succession of points along said axes, said values constituting the information by which, in the adhesive-applying mode of the machine, the mounting is moved along the desired operating path as aforesaid.

3. A machine according to claim 2 wherein adjacent the sensing head is arranged a slide abutment which is resiliently urged against the shoe bottom and serves to hold the sensing head at a defined distance from the shoe bottom.

4. A machine according to claim 2 wherein the mounting is supported on a lever arm which is itself mounted for movement in directions extending lengthwise and transversely of the bottom of a shoe supported by the shoe support, the drive means comprising drive motors for effecting such movement of the arm.

5. A machine according to claim 4 wherein the lever arm is mounted for pivotal movement about two mutually perpendicular axes.

6. A machine according to claim 4 wherein adjacent the sensing head is arranged a slide abutment which is resiliently urged against the shoe bottom and serves to hold the sensing head at a defined distance from the shoe bottom.

7. A machine for performing a progressive adhesive-applying operation along marginal portions of shoe bottoms, comprising a shoe support for supporting a shoe to the bottom of which adhesive is to be applied, two mountings on each of which selectively an adhesive-applying nozzle or a sensing head can be mounted, said mountings each being resiliently urged in a direction towards the bottom of a shoe supported by the shoe support, drive means for moving the mountings each along two coordinate axes relative to the shoe bottom, and computer control means for controlling the movement of each of the mountings along the two coordinate axes, along a desired operating path, under the action of the drive means, said computer control means including a memory in which information comprising coordinate axis values for each such operating path is stored, wherein, in a path-determining mode of the machine, with a sensing head mounted on each of the mountings and with an outline of the desired operating path supported by the shoe support, the drive means is caused to operate the move each mounting along one of its coordinate axes and, in response to the path of either of the sensing heads diverging from said outline, to move the mounting supporting such sensing head along the other of its coordinate axes thus to maintain a desired relationship, in the direction of said other of the coordinate axes, between the outline and the sensing heads, and wherein the computer control means monitors the movement of each of the mountings along the two axes and stores in the memory the coordinate axis values for each of a succession of points along said axis, said values constituting the information by which, in the adhesive-applying mode of the machine, the mountings are moved along the desired operating path as aforesaid.

8. A machine according to claim 7 wherein adjacent each sensing head is arranged a slide abutment, said abutments being resiliently urged against the shoe bottom and serving to hold the sensing heads at a defined distance from the shoe bottom.

9. A machine according to claim 7 wherein each mounting is supported on a lever arm which is itself mounted for movement in directions extending lengthwise and transversely of the bottom of a shoe supported by the shoe support, the drive means comprising drive motors for effecting such movement of each of the arms.

10. A machine according to claim 9 wherein the lever arms are each mounted for pivotal movement about two mutually perpendicular axes.

11. A machine according to claim 10 wherein the lever arms are each mounted for pivotal movement about one of said two axes on a common support itself mounted for pivotal movement about the other of said axes.

12. A machine according to claim 11 wherein adjacent each sensing head is arranged a slide abutment, said abutments being resiliently urged against the shoe bottom and serving to hold the sensing heads at a defined distance from the shoe bottom.

* * * * *